(12) United States Patent
Sakaguchi

(10) Patent No.: US 12,573,425 B2
(45) Date of Patent: Mar. 10, 2026

(54) GLASS COMPOSITION, GLASS SHEET AND METHOD FOR PRODUCING SAME, AND SUBSTRATE FOR INFORMATION RECORDING MEDIUM

(71) Applicant: Nippon Sheet Glass Company, Limited, Tokyo (JP)

(72) Inventor: Koichi Sakaguchi, Osaka (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 1055 days.

(21) Appl. No.: 17/429,863

(22) PCT Filed: Feb. 21, 2020

(86) PCT No.: PCT/JP2020/007233

§ 371 (c)(1),
(2) Date: Aug. 10, 2021

(87) PCT Pub. No.: WO2020/175407

PCT Pub. Date: Sep. 3, 2020

(65) Prior Publication Data

US 2022/0139424 A1 May 5, 2022

(30) Foreign Application Priority Data

Feb. 25, 2019 (JP) ................................. 2019-031304

(51) Int. Cl.
| | |
|---|---|
| *G11B 5/73* | (2006.01) |
| *C03B 18/02* | (2006.01) |
| *C03C 3/087* | (2006.01) |
| *C03C 3/095* | (2006.01) |

(52) U.S. Cl.
CPC .......... *G11B 5/73921* (2019.05); *C03C 3/087* (2013.01); *C03C 3/095* (2013.01); *C03B 18/02* (2013.01)

(58) Field of Classification Search
None
See application file for complete search history.

(56) References Cited

U.S. PATENT DOCUMENTS

| | | | |
|---|---|---|---|
| 5,997,977 A | 12/1999 | Zou et al. | |
| 6,251,812 B1 * | 6/2001 | Koyama | C03C 21/002 |
| | | | 428/64.2 |
| 6,306,786 B1 | 10/2001 | Koyama et al. | |
| 6,576,353 B1 | 6/2003 | Mitani et al. | |
| 8,966,939 B2 * | 3/2015 | Nakae | C03C 19/00 |
| | | | 451/37 |
| 9,688,565 B2 * | 6/2017 | Senshu | C03C 3/087 |
| 2018/0222789 A1 * | 8/2018 | Maeda | C03C 3/087 |

FOREIGN PATENT DOCUMENTS

| | | | | |
|---|---|---|---|---|
| JP | H1081542 | 3/1998 | | |
| JP | H11302032 | 11/1999 | | |
| JP | H11302033 | 11/1999 | | |
| JP | 2000268348 | 9/2000 | | |
| JP | 2012256389 | 12/2012 | | |
| JP | 2016115378 | 6/2016 | | |
| WO | 9855993 | 12/1998 | | |
| WO | WO-0204371 A1 * | 1/2002 | | C03C 3/083 |
| WO | 2018225725 | 12/2018 | | |

OTHER PUBLICATIONS

Machine Translation of WO-0204371-A1 ("Namekawa") (Year: 2002).*
International Search Report and Written Opinion issued for International Patent Application No. PCT/JP2020/007233, Date of mailing: Apr. 14, 2020, 10 pages including English translation of Search Report.
Extended European Search Report issued for European Patent Application No. 20762597.1, dated Oct. 25, 2022, 8 pages.

* cited by examiner

*Primary Examiner* — Amber R Orlando
*Assistant Examiner* — Paul Alan Forsyth
(74) *Attorney, Agent, or Firm* — HSML P.C.

(57) ABSTRACT

The present invention provides a glass composition including, as components, in mol %: 50 to 70% $SiO_2$; 10 to 20% $Al_2O_3$; 2 to 5% MgO; 3 to 15% CaO; 3 to 15% $Li_2O$; 3 to 15% $Na_2O$; and 0 to 5% $K_2O$, wherein when a content of a component X in mol % is expressed as [X], $[Al_2O_3]$—$[R_2O]$ is less than −0.5%, where $[R_2O]$ is the sum of $[Li_2O]$, $[Na_2O]$, and $[K_2O]$.

14 Claims, No Drawings

GLASS COMPOSITION, GLASS SHEET AND METHOD FOR PRODUCING SAME, AND SUBSTRATE FOR INFORMATION RECORDING MEDIUM

TECHNICAL FIELD

The present invention relates to a glass composition and particularly relates to a glass composition suitable for a substrate of an information recording medium. The present invention also relates to a glass sheet formed of the glass composition, a method for producing the glass sheet, and even a substrate for an information recording medium, the substrate including the glass sheet.

BACKGROUND ART

Larger recording capacity and shorter access time have been required of information recording devices such as magnetic disks. One of the means for satisfying the requests is faster rotation of information recording media.

However, a substrate of an information recording medium deflects by rotation. The deflection may increase resonance of the information recording medium with increasing rotational speed and may end up with a collision between the information recording medium and a magnetic head to cause a read error or a magnetic head crash. Because of that, it is impossible to decrease the distance, called the flying height, between a magnetic head and an information recording medium having a conventional substrate to a certain distance or less. This prevents an increase in recording capacity.

Substrates desirably have a high elastic modulus to reduce deflection and resonance of the substrates. Glass is known to basically have a higher Young's modulus than that of an aluminum alloy forming an aluminum substrate, though the Young's modulus of glass depends on the composition thereof. Patent Literatures 1 and 2, for example, disclose glasses developed to be used as substrates of information recording mediums.

CITATION LIST

Patent Literature

Patent Literature 1: JP H10-081542 A
Patent Literature 2: WO 98/55993 A1

SUMMARY OF INVENTION

Technical Problem

However, the glasses disclosed in Patent Literatures 1 and 2 have a high density, and thus need to be improved in view of reducing load on a motor of an information recording device and preventing breakage by dropping. Patent Literatures 1 and 2 discuss increasing the specific elastic modulus of each glass in view of preventing deflection during rotation, the specific elastic modulus being determined by dividing the Young's modulus by the density. Even when the density is high, a Young's modulus high enough to compensate for the high density makes it possible to maintain the specific elastic modulus of glass at a high level. Thus, the glasses disclosed in Patent Literatures 1 and 2 have a density of about 2.67 g/cm$^3$ or more, which is not sufficiently low.

The shaping temperature and devitrification temperature of glass are desirably in appropriate ranges to produce the glass by a method, typically a float process, suitable for mass production.

It is accordingly an object of the present invention to provide a glass composition having a specific elastic modulus high enough to reduce deflection caused by rotation of a substrate formed of the glass composition, having a low density, and suitable for mass production.

Solution to Problem

As a result of energetic studies of the contents of components in an aluminosilicate glass and the properties thereof, the present inventor has successfully achieved the above object by adjusting the contents of glass components.

The present invention provides a glass composition including, as components, in mol %:

50 to 70% $SiO_2$;
10 to 20% $Al_2O_3$;
2 to 5% MgO;
3 to 15% CaO;
3 to 15% $Li_2O$;
3 to 15% $Na_2O$; and
0 to 5% $K_2O$, wherein
when a content of a component X in mol % is expressed as [X], $[Al_2O_3]— [R_2O]$ is less than −0.5%, where $[R_2O]$ is the sum of $[Li_2O]$, $[Na_2O]$, and $[K_2O]$.

The present invention also provides a glass sheet formed of the glass composition according to the present invention.

The present invention also provides a substrate for an information recording medium, the substrate including the glass sheet according to the present invention.

The present invention also provides a method for producing a glass sheet, including:

melting glass raw materials; and shaping the molten glass raw materials into a glass sheet by a float process, wherein the glass raw materials are prepared so that the glass sheet is formed of the glass composition according to the present invention.

Advantageous Effects of Invention

According to the present invention, a glass composition having a high specific elastic modulus, having a low density, and suitable for mass production can be provided.

DESCRIPTION OF EMBODIMENTS

Hereinafter, the symbol % used to indicate the contents of components of a glass composition is "mol %" unless otherwise specified. Preferred ranges of the contents of components, the sum totals of the components, ratios determined by given expressions, property values of glass, etc. can be obtained by combining any of preferred upper and lower limits individually described below. Hereinafter, for simplicity of description, the content of a component in mol % is sometimes expressed as [X]. The X represents a component forming a glass composition. Accordingly, for example, $[Al_2O_3]+[SiO_2]$ means the sum of the content of $Al_2O_3$ in mol % and the content of $SiO_2$ in mol %. $[R_2O]$ means the sum of $[Li_2O]$, $[Na_2O]$, and $[K_2O]$($[R_2O][Li_2O]+[Na_2O]+[K_2O]$), and [R'O] means the sum of [MgO] and [CaO]([R'O]=[MgO]+[CaO]).

Hereinafter, the term "substantially free" is used to mean that the content of a component of interest is limited to less than 0.1 mol %, preferably less than 0.07 mol %, and even more preferably less than 0.05 mol %. Industrially produced glass compositions often contain a small amount of impurities derived from, for example, an industrial raw material.

The term "substantially" is used to mean that inevitable impurities are allowed to be contained as long as the upper limit of the content thereof is as described above. Additionally, the following description of embodiments of the present invention is not intended to limit the present invention to specific embodiments.

$SiO_2$ is a component for forming a network structure of the glass. Silica glass formed only of $SiO_2$ has a Young's modulus of about 70 GPa while common soda-lime glass (the $SiO_2$ content is a little more than 70%) has a Young's modulus of 72 GPa. A low $SiO_2$ content is generally desirable to improve the Young's modulus. The content of $SiO_2$ is preferably 70% or less, 68% or less, 67% or less, 65% or less, less than 64%, or particularly less than 63%, and may be, in some cases, 62% or less, or even 61% or less. When the Young's modulus needs to be greatly improved, the content of $SiO_2$ may be 60% or less or even 58% or less. Too low a content of $SiO_2$ decreases the stability of the glass network structure and causes defects such as an increase in devitrification temperature. The content of $SiO_2$ is preferably 50% or more, 52% or more, 53% or more, 54% or more, or particularly 55% or more, and may be, in some cases, 56% or more. A relatively high $SiO_2$ content is generally desirable to decrease the density. For a particularly low density, the content of $SiO_2$ may be 58% or more.

$Al_2O_3$ is a component that improves the Young's modulus of the glass and that suppresses devitrification when used in an adequate amount. Too high a content of $Al_2O_3$ increases the viscosity and devitrification temperature of the glass and decreases the meltability thereof. The content of $Al_2O_3$ is preferably 20% or less, 19% or less, 18% or less, or particularly 16% or less, and may be, in some cases, 15.5% or less, or even 15% or less. The content of $Al_2O_3$ is preferably 10% or more, 11% or more, 12% or more, or particularly 13% or more, and may be, in some cases, 14% or more.

$[Al_2O_3]/([Al_2O_3]+[SiO_2])$ is preferably 0.140 or more, 0.150 or more, particularly 0.160 or more, or, in some cases, 0.165 or more to increase the Young's modulus. This ratio is more preferably 0.220 or less, less than 0.215, particularly 0.210 or less, or, in some cases, less than 0.205 to obtain a favorable devitrification temperature.

MgO is a component that improves the Young's modulus of the glass, that decreases the density thereof, and that improves the meltability thereof. However, too high a MgO content increases the devitrification temperature of the glass. The content of MgO is preferably 2% or more, 2.2% or more, or particularly 2.3% or more, and may be, in some cases, 2.4% or more. The content of MgO is preferably 5% or less, 4% or less, or particularly 3.5% or less, and may be, in some cases, 3.3% or less, or even less than 3%.

CaO is a component that decreases the viscosity of the glass at high temperatures and that improves the meltability thereof. However, too high a content of CaO is likely to cause devitrification of the glass. The content of CaO is preferably 3% or more, 4% or more, 5% or more, or particularly 6% or more, and may be, in some cases, 7% or more, or even 8% or more. The content of CaO is preferably 15% or less, 12% or less, 11% or less, even less than 11%, or particularly 10% or less, and may be, in some cases, 9% or less.

$[R'O]$ is preferably 5% or more, 7% or more, 8% or more, particularly 9% or more, or, in some cases, 10% or more to improve the meltability of the glass. $[R'O]$ is preferably 15% or less, 14% or less, particularly 13% or less, in some cases, less than 12.5%, or even 12% or less to decrease the devitrification property.

$[CaO]/[R'O]$ is preferably 0.650 or more, 0.700 or more, or particularly 0.725 or more to obtain a satisfactory devitrification resistance, and is preferably 0.850 or less, 0.800 or less, or particularly 0.775 or less for the same reason.

$Li_2O$ is a component that increases the meltability of the glass and that is suitable for maintaining the Young's modulus among the glass network-modifying components. However, too high a content of $Li_2O$ decreases the Young's modulus of the glass and excessively decreases the viscosity, leading to a less satisfactory devitrification resistance. The content of $Li_2O$ is preferably 3% or more, 5% or more, 7% or more, 7.5% or more, or particularly more than 7.7%, and may be, in some cases, 8% or more, or even 8.2% or more. The content of $Li_2O$ is preferably 15% or less, 12% or less, 11% or less, 10% or less, or particularly less than 10%, and may be, in some cases, less than 9.4%, 9% or less, or even 8.8% or less.

$Na_2O$ is a component that increases the meltability of the glass and that suppresses devitrification thereof. However, too high a content of $Na_2O$ decreases the Young's modulus and excessively decreases the viscosity. The content of $Na_2O$ is preferably 3% or more, 5% or more, 7% or more, or particularly 7.2% or more, and may be, in some cases, 7.5% or more. The content of $Na_2O$ is preferably 15% or less, 12% or less, 11% or less, 10% or less, or particularly less than 9%, and may be, in some cases, 8.4% or less, or even 8% or less.

$K_2O$ is an optional component that increases the meltability of the glass and suppresses devitrification thereof when added at a small amount. However, too high a content of $K_2O$ decreases the Young's modulus and excessively decreases the viscosity. The content of $K_2O$ may be 0.05% or more, particularly 0.1% or more, or, in some cases, 0.15% or more. The content of $K_2O$ is preferably 5% or less, 3% or less, or particularly 2% or less, and may be, in some cases, 1% or less, or even 0.5% or less.

$[R_2O]$ is desirably adjusted to 10 to 20% to keep favorable meltability and a satisfactory devitrification resistance of the glass and not to decrease the formability as a result of excessive decrease in viscosity. $[R_2O]$ is more preferably 12% or more, 13% or more, particularly 15% or more, in some cases, 15.5% or more, or even 16% or more, and is recommended to be 20% or less, 19% or less, particularly 18% or less, in some cases, 17.4% or less, or even 17% or less.

$[Na_2O]/([Na_2O]+[Li_2O])$ is preferably 0.360 or more, 0.400 or more, or particularly 0.420 or more to maintain a satisfactory devitrification resistance, and is preferably 0.600 or less, 0.560 or less, particularly 0.540 or less, or, in some cases, 0.520 or less for the same reason.

$[R_2O]/([R_2O]+[R'O])$ is preferably 0.550 or more, 0.560 or more, or particularly 0.570 or more to obtain a satisfactory devitrification resistance, and is preferably 0.635 or less, 0.630 or less, particularly 0.620 or less, or, in some cases, 0.610 or less for the same reason.

The ratio of the content of $Na_2O$ on a mass basis to the total content of $Li_2O$, $Na_2O$, $K_2O$, MgO and CaO on a mass basis is preferably less than 0.500 to obtain a satisfactory devitrification resistance. For the same reason, $[Na_2O]/([R_2O]+[R'O])$ is preferably less than 0.380.

$([R_2O]+[R'O])/([R_2O]+[R'O]+[Al_2O_3])$ is preferably 0.610 or more, 0.620 or more, particularly 0.630 or more, or, in some cases, 0.635 or more so as not to result in an excessively low shaping temperature relative to the absolute value of the viscosity and the devitrification temperature. This ratio is preferably 0.700 or less, less than 0.695, particularly 0.690 or less, or, in some cases, less than 0.685 so as not to result in an excessively high devitrification temperature.

An increase in $[Al_2O_3]$— $[R_2O]$ increases the viscosity and excessively increases the devitrification temperature. $[Al_2O_3]$— $[R_2O]$ is preferably less than –0.5%, –0.7% or less, or particularly –1% or less, and may be, in some cases, –1.3% or less, –1.4% or less, or even –1.5% or less.

$TiO_2$ is an optional component that increases the Young's modulus of the glass. However, because $TiO_2$ increases the density and also affects the devitrification property, the content of $TiO_2$ is preferably 0.2% or less. $ZrO_2$ is a similar optional component, and the content thereof is preferably 0.2% or less. $[TiO_2]+[ZrO_2]$ which corresponds to the sum of the contents of $TiO_2$ and $ZrO_2$ is also preferably 0.2% or less. More preferably, the glass composition is substantially free of $TiO_2$ and ZrO. Meanwhile, because of the decreasing effect of $TiO_2$ and/or $ZrO_2$ on a devitrification temperature TL, $[TiO_2]+[ZrO_2]$ may be 0.005% or more.

$SnO_2$ and $CeO_2$ are optional components that can exert the refining effect as valences of Sn or Ce change. However, too high contents of $SnO_2$ and $CeO_2$ increase the density of the glass and, in some cases, lead to a less satisfactory devitrification resistance. The contents of $SnO_2$ and $CeO_2$ are each preferably 0.2% or less or even 0.07% or less, and, more preferably, the glass composition is substantially free of $SnO_2$ and $CeO_2$. Even more preferably, the sum of the contents of $SnO_2$ and $CeO_2$ is limited to such a small value that the glass composition can be considered to be substantially free of $SnO_2$ and $CeO_2$. For example, the sum of the contents of $SnO_2$ and $CeO_2$ ($[SnO_2]+[CeO_2]$) is limited to 0.07% or less or even less than 0.07%.

SrO and BaO, which are also optional components, increase the density of the glass. The contents of SrO and BaO are each preferably 0.2% or less. $[SrO]+[BaO]$ which corresponds to the sum of the contents of SrO and BaO is more preferably 0.2% or less. Even more preferably, the glass composition is substantially free of SrO and BaO.

$Nb_2O_5$, a lanthanide oxide, $Y_2O_3$, and $Ta_2O_5$ are optional components that have an effect on improving the Young's modulus of the glass. However, these optional components sometimes increase the density of the glass and lead to a less satisfactory devitrification resistance. It is preferred that the glass composition be substantially free of $Nb_2O_5$, the lanthanide oxide, $Y_2O_3$, and $Ta_2O_5$. The lanthanide oxide is an oxide of any of the elements having atomic numbers from 57 to 71.

$P_2O_5$, $B_2O_3$, and F are optional components that accelerates melting of the raw materials. However, these components facilitate erosion of a refractory material of a melting furnace, and condensate on the furnace wall after volatilization and then sometimes enter a glass melt as foreign matters. It is preferred that the glass composition be substantially free of $P_2O_5$, $B_2O_3$, and F.

It is known that addition of sulfuric acid salt as a part of a raw material promotes refining. When a sulfuric acid salt is added, $SO_3$ generated from the sulfuric acid salt is often left in the glass. The content of $SO_3$ is preferably 0.5% or less, 0.3% or less, or even 0.2% or less. $SO_3$ is an optional component and the glass composition may be substantially free of $SO_3$.

Examples of other optional components that can exert the refining effect include $As_2O_5$, $Sb_2O_5$, and Cl. However, these components have a major effect on the environment (the same can be said for F on this point). It is preferred that the glass composition be substantially free of $As_2O_5$, $Sb_2O_5$, and Cl.

A typical impurity inevitably introduced from an industrial raw material of glass is iron oxide. Iron oxide is present in the glass composition as a divalent oxide (FeO) or a trivalent oxide ($Fe_2O_3$). The content [T-$Fe_2O_3$] of iron oxide calculated in terms of the trivalent oxide is preferably 0.5% or less, 0.3% or less, or particularly 0.2% or less. When coloring of the glass should be avoided, it is preferred that the glass composition be substantially free of iron oxide (T-$Fe_2O_3$) calculated in terms of $Fe_2O_3$.

The glass composition according to the present invention can contain an optional component other than the above, but it is preferred that the glass composition be substantially free of an optional component other than the above.

In a preferred embodiment, the glass composition according to the present invention has the following composition.
[$SiO_2$]: 55 to 64% (excluding 64%)
[$Al_2O_3$]: 11 to 16%
[MgO]: 2 to 3.5%
[CaO]: 5 to 11% (excluding 5%)
[LiO]: 7.7 to 10% (excluding 7.7% and 10%)
[$Na_2O$]: 7 to 9% (excluding 9%)
[$K_2O$]: 0 to 2%
[R'O]: 8 to 13%
[$R_2O$]: 15 to 18%
[$Al_2O_3$]— [$R_2O$]: less than –0.5%
It is preferred that the following be satisfied in this embodiment.
$[Al_2O_3]/([Al_2O_3]+[SiO_2])$: 0.140 to 0.220
$([R_2O]+[R'O])/([R_2O]+[R'O]+[Al_2O_3])$: 0.610 to 0.700
$[R_2O]/([R_2O]+[R'O])$: 0.550 to 0.630
It is more preferred that the following be further satisfied in this embodiment.
$[CaO]/([CaO]+[MgO])$: 0.650 to 0.850
$[Na_2O]/([Na_2O]+[Li_2O])$: 0.360 to 0.600
In a preferred embodiment, the properties that the glass composition according to the present invention can have, specifically the elastic modulus, density, and temperature properties, are as follows.

The Young's modulus is preferably 85 GPa or more, 86 GPa or more, or even 86.5 GPa or more. The density is preferably 2.565 $g/cm^3$ or less, 2.550 $g/cm^3$ or less, or even 2.546 $g/cm^3$ or less. The specific elastic modulus is preferably $34 \times 10^6$ Nm/kg or more or even $34.5 \times 10^6$ Nm/kg or more. The specific elastic modulus is a value calculated by dividing the Young's modulus by the density. Such a high specific elastic modulus as described above is advantageous in terms of preventing deflection of a rotating substrate. In a preferred embodiment, the glass composition according to the present invention can have both a high specific elastic modulus as described above and a low density as described above.

In a preferred embodiment, the glass composition according to the present invention has the following properties.
Young's modulus: 85 GPa or more
Density: 2.565 $g/cm^3$ or less
Specific elastic modulus: $34 \times 10^6$ Nm/kg or more
The devitrification temperature TL is preferably 1110° C. or lower, 1105° C. or lower, or even 1100° C. or lower. A shaping temperature T4 is preferably 1020° C. or higher or even 1040° C. or higher. A difference ΔT (ΔT=T4–TL) determined by subtracting the devitrification temperature TL from the shaping temperature T4 is preferably greater than 0, more preferably 5° C. or higher, even more preferably 10° C. or higher, much more preferably 15° C. or higher, and particularly preferably 18° C. or higher. Here, the shaping temperature T4 is a temperature at which the viscosity measured by a platinum ball-drawing method is 104 dPa·s.

The devitrification temperature TL is the highest temperature at which devitrification was observed in glass taken out of a temperature-gradient electric furnace, the glass being obtained by holding a crushed glass specimen in the furnace for 2 hours. In a preferred embodiment, the glass composition according to the present invention can have a low devitrification temperature as described above and a positive difference ΔT.

A preferred strain point is less than 530° C. A glass having such a property temperature has a glass-transition point lower than 580° C. or even lower than 570° C. This property is determined to make glass shaping and post-shaping cooling much easier.

A preferred linear thermal expansion coefficient is 80 to $88 \times 10^{-7}/°$ C. Here, the linear thermal expansion coefficient refers to the average linear thermal expansion coefficient in the temperature range of 50 to 350° C. This linear thermal expansion coefficient value is lower than that of common soda-lime glass used, for example, for windows of buildings and vehicles. A lower linear thermal expansion coefficient is advantageous in terms of reducing residual strain, and can reduce warping of a glass sheet and improve cutting stability, for example, when the glass sheet is produced by a float process.

As can be easily understood from the above temperature properties, the glass composition according to the present invention is suitable for mass production by a float process. By the float process, a glass sheet called float glass is produced from the glass composition according to the present invention. As is well known, the float process includes: melting glass raw materials in a melting furnace; and introducing the molten glass raw materials into a float bath to shape the molten glass raw materials into a glass sheet on molten tin in the float bath. In one embodiment of the present invention, float glass is produced by preparing glass raw materials so that a glass composition forming the resulting glass sheet will have the above desirable composition. The float glass is shaped with one principal surface in contact with molten tin in a float bath, and the tin spreads over the principal surface. Accordingly, one principal surface, called a bottom surface, of the float glass has a surface layer formed of tin spread thereon. The other principal surface, called a top surface, does not have such a surface layer. From another perspective, in the float glass, the concentration of tin on one principal surface is higher than that on the other principal surface.

The glass sheet may be a chemically strengthened glass sheet. As is well known, chemical strengthening is a treatment in which compressive stress is introduced in a surface of glass by substituting alkali ions contained in glass with other alkali ions having a larger ionic radius, for example, by substituting lithium ions with sodium ions or sodium ions with potassium ions. Chemical strengthening of the glass sheet is commonly performed by bringing the glass sheet into contact with a molten salt including alkali ions. The molten salt is, for example, potassium nitrate or a salt mixture of potassium nitrate and sodium nitrate. When the molten salt used includes potassium nitrate alone, it is appropriate that the molten salt be at a temperature of about 460° C. to 500° C. in view of thermal decomposition of potassium nitrate and the thermal resistance of the glass. It is appropriate that the time during which the glass and the molten salt are in contact with each other be, for example, 4 hours to 12 hours.

The chemically strengthened glass sheet is particularly suitable for a substrate for an information recording medium. The glass sheet according to the present invention can also be used in other applications such as cover glasses of displays and solar cells.

EXAMPLES

Hereinafter, the present invention will be described in more detail using specific examples. The examples given below are not intended to limit the present invention, either.

Batches were prepared to give compositions shown in Table 1 using silica, alumina, lithium carbonate, sodium carbonate, magnesium oxide, calcium carbonate, potassium carbonate, etc. which are common glass raw materials. Each of the prepared batches was put in a platinum crucible, held at 1580° C. for 4 hours, and then poured onto an iron plate. This glass was held in an electric furnace at 650° C. for 30 minutes, after which the furnace was turned off to cool the glass to room temperature. A glass specimen was thus obtained. Properties of thus-obtained glass specimens were measured by the following methods. Table 1 shows the results.

[Density and Young's Modulus]

Plate-shaped samples having dimensions of 25×25×5 mm were fabricated by cutting the glass specimens and mirror-polishing every surface thereof. The density of each sample was measured by Archimedes' principle. The Young's modulus of each sample was measured according to the ultrasonic pulse method in JIS R 1602-1995. Specifically, each sample used in the above density measurement was used to measure, for longitudinal and transverse waves, the sound speed at which an ultrasonic pulse propagates. The sound speeds and the above density were substituted in the formula defined in JIS R 1602-1995 to calculate the Young's modulus E. The propagation speeds were evaluated using an ultrasonic thickness gage MODEL 25DL PLUS manufactured by Olympus Corporation by dividing the time required by a 20 kHz ultrasonic pulse to propagate in the thickness direction of the sample, be reflected, and then come back by the propagation distance (twice the thickness of the sample).

[Glass-Transition Point and Linear Thermal Expansion Coefficient]

A cylindrical specimen having a diameter of 5 mm and a length of 18 mm was fabricated from each glass specimen. The cylindrical specimen was heated at 5° C./minute using a TMA apparatus to measure a thermal expansion curve. From this curve, the glass-transition point and the average linear thermal expansion coefficient in the temperature range of 50 to 350° C. were obtained.

[Measurement of Devitrification Temperature TL]

Each glass specimen was crushed into particles, which were sieved to obtain particles that pass through a sieve having an opening size of 2.83 mm and are retained on a sieve having an opening size of 1.00 mm. These particles were washed to remove fine powder thereon, followed by drying to prepare a sample for devitrification temperature measurement. An amount of 25 g of the sample for devitrification temperature measurement was put in a platinum boat (a lidless rectangular platinum container) to have an approximately uniform thickness, held in a temperature-gradient furnace for 2 hours, and then taken out of the furnace. The highest temperature at which devitrification was observed in the glass was employed as the devitrification temperature of the sample.

[Measurement of Shaping Temperature T4]

The viscosity was measured by a platinum ball-drawing method, and a temperature at which the thus-measured viscosity was 104 dPa·s was employed as the shaping temperature T4.

The specimens 1 to 13 have a Young's modulus of 85 GPa or more, a density of 2.565 $g/cm^3$ or less, and a specific elastic modulus of $34 \times 10^6$ Nm/kg or more. The specimens 1 to 12 have a devitrification temperature of 1110° C. or lower while the specimen 13 has a devitrification temperature higher than 1110° C.

TABLE 1

| Specimen No. | 1 | 2 | 3 | 4 | 5 | 6 | 7 |
|---|---|---|---|---|---|---|---|
| $SiO_2$ | 61.52 | 59.52 | 57.52 | 61.52 | 61.52 | 59.52 | 59.52 |
| $Al_2O_3$ | 12.21 | 13.21 | 14.21 | 12.87 | 13.45 | 13.54 | 14.15 |
| MgO | 2.54 | 2.73 | 2.92 | 2.42 | 2.31 | 2.67 | 2.55 |
| CaO | 7.63 | 8.19 | 8.75 | 7.26 | 6.93 | 8.01 | 7.66 |
| $Li_2O$ | 8.28 | 8.41 | 8.54 | 8.20 | 8.12 | 8.37 | 8.29 |
| $Na_2O$ | 7.63 | 7.75 | 7.87 | 7.56 | 7.49 | 7.71 | 7.64 |
| $K_2O$ | 0.18 | 0.18 | 0.18 | 0.18 | 0.18 | 0.18 | 0.18 |
| R'O = MgO + CaO | 10.17 | 10.92 | 11.67 | 9.68 | 9.25 | 10.68 | 10.22 |
| $R_2O = Li_2O + Na_2O + K_2O$ | 16.10 | 16.35 | 16.60 | 15.93 | 15.79 | 16.27 | 16.11 |
| $Al_2O_3 - R_2O$ | −3.88 | −3.13 | −2.38 | −3.06 | −2.34 | −2.72 | −1.96 |
| $Al_2O_3/(Al_2O_3 + SiO_2)$ | 0.166 | 0.182 | 0.198 | 0.173 | 0.179 | 0.185 | 0.192 |
| $(R_2O + R'O)/(R_2O + R'O + Al_2O_3)$ | 0.683 | 0.674 | 0.665 | 0.666 | 0.651 | 0.665 | 0.650 |
| $R_2O/(R_2O + R'O)$ | 0.613 | 0.599 | 0.587 | 0.622 | 0.631 | 0.604 | 0.612 |
| CaO/R'O | 0.750 | 0.750 | 0.750 | 0.750 | 0.750 | 0.750 | 0.750 |
| $Na_2O/(Na_2O + Li_2O)$ | 0.480 | 0.480 | 0.480 | 0.480 | 0.480 | 0.480 | 0.480 |
| Glass-transition point (° C.) | 544 | 548 | 553 | 550 | 559 | 553 | 556 |
| Linear thermal expansion coefficient ($10^{-7}/°$ C.) | 84 | 85 | 86 | 82 | 81 | 84 | 83 |
| Density ($g/cm^3$) | 2.509 | 2.523 | 2.536 | 2.505 | 2.502 | 2.521 | 2.517 |
| Young's modulus (GPa) | 86.7 | 87.8 | 88.7 | 86.9 | 86.9 | 88.1 | 87.8 |
| Specific elastic modulus ($10^6$ Nm/kg) | 34.6 | 34.8 | 35.0 | 34.7 | 34.7 | 35.0 | 34.9 |
| Devitrification temperature TL (° C.) | 1023 | 1029 | 1031 | 1061 | 1080 | 1054 | 1072 |
| Shaping temperature T4 (° C.) | 1051 | 1041 | 1075 | 1080 | 1103 | 1073 | 1105 |
| ΔT = T4 − TL (° C.) | 28 | 12 | 44 | 19 | 23 | 19 | 33 |

| Specimen No. | 8 | 9 | 10 | 11 | 12 | 13* |
|---|---|---|---|---|---|---|
| $SiO_2$ | 57.52 | 57.52 | 56.52 | 56.52 | 56.52 | 56.52 |
| $Al_2O_3$ | 14.85 | 15.49 | 14.55 | 14.71 | 15.20 | 16.60 |
| MgO | 2.80 | 2.68 | 3.04 | 3.01 | 2.92 | 2.66 |
| CaO | 8.39 | 8.03 | 9.13 | 9.03 | 8.76 | 7.98 |
| $Li_2O$ | 8.46 | 8.38 | 8.63 | 8.61 | 8.55 | 8.36 |
| $Na_2O$ | 7.80 | 7.72 | 7.95 | 7.93 | 7.88 | 7.71 |
| $K_2O$ | 0.18 | 0.18 | 0.18 | 0.18 | 0.18 | 0.18 |
| R'O = MgO + CaO | 11.19 | 10.71 | 12.17 | 12.05 | 11.68 | 10.63 |
| $R_2O = Li_2O + Na_2O + K_2O$ | 16.44 | 16.28 | 16.76 | 16.72 | 16.60 | 16.25 |
| $Al_2O_3 - R_2O$ | −1.58 | −0.78 | −2.21 | −2.01 | −1.40 | 0.35 |
| $Al_2O_3/(Al_2O_3 + SiO_2)$ | 0.205 | 0.212 | 0.205 | 0.207 | 0.212 | 0.227 |
| $(R_2O + R'O)/(R_2O + R'O + Al_2O_3)$ | 0.650 | 0.635 | 0.665 | 0.662 | 0.650 | 0.618 |
| $R_2O/(R_2O + R'O)$ | 0.595 | 0.603 | 0.579 | 0.581 | 0.587 | 0.604 |
| CaO/R'O | 0.750 | 0.750 | 0.750 | 0.750 | 0.750 | 0.750 |
| $Na_2O/(Na_2O + Li_2O)$ | 0.480 | 0.480 | 0.480 | 0.480 | 0.480 | 0.480 |
| Glass-transition point (° C.) | 560 | 568 | 555 | 556 | 560 | 578 |
| Linear thermal expansion coefficient ($10^{-7}/°$ C.) | 84 | 83 | 85 | 85 | 85 | 82 |

TABLE 1-continued

| | | | | | | |
|---|---|---|---|---|---|---|
| Density (g/cm³) | 2.531 | 2.528 | 2.542 | 2.542 | 2.539 | 2.531 |
| Young's modulus (GPa) | 88.6 | 88.5 | 89.3 | 89.3 | 89.2 | 89.4 |
| Specific elastic modulus (10⁶ Nm/kg) | 35.0 | 35.0 | 35.1 | 35.1 | 35.1 | 35.3 |
| Devitrification temperature TL (° C.) | 1074 | 1105 | 1046 | 1039 | 1063 | 1127 |
| Shaping temperature T4 (° C.) | 1122 | 1173 | 1070 | 1078 | 1119 | 1017 |
| ΔT = T4 – TL (° C.) | 48 | 68 | 24 | 39 | 56 | –110 |

*No. 13 is a comparative example. The contents of the components are in mol %. The symbol [ ] used to indicate the contents is omitted in the table.

The invention claimed is:

1. A glass composition comprising, as components, in mol %:

50 to 70% $SiO_2$;
10 to 15.5% $Al_2O_3$;
2 to 5% MgO;
3 to 15% CaO;
3 to 15% $Li_2O$;
3 to 15% $Na_2O$; and
0 to 5% $K_2O$, wherein
when a content of a component X in mol % is expressed as [X], $[Al_2O_3]—[R_2O]$ is less than –0.5%,
where $[R_2O]$ is the sum of $[Li_2O]$, $[Na_2O]$, and $[K_2O]$,
$[Al_2O_3]/([Al_2O_3]+[SiO_2])$ is 0.160 or more and less than 0.215,
$([R_2O]+ [R'O])/([R_2O]+[R'O]+ [Al_2O_3])$ is 0.620 to 0.700,
where [R'O] is the sum of [MgO] and [CaO],
$[R_2O]/([R_2O]+[R'O])$ is 0.550 to 0.635,
a Young's modulus is 85 GPa or more,
a density is 2.565 g/cm³ or less,
a specific modulus is 34×10⁶ Nm/kg or more, and
a difference ΔT determined by subtracting a devitrification temperature TL from a shaping temperature T4 is greater than 0.

2. The glass composition according to claim 1, wherein $[SiO_2]$ is 52 to 68%,
[R'O] is 5 to 15%, and
$[R_2O]$ is 10 to 17%.

3. The glass composition according to claim 1, comprising, in mol %:

53 to 67% $SiO_2$;
10 to 15.5% $Al_2O_3$;
2 to 4% MgO;
4 to 12% CaO;
5 to 12% $Li_2O$;
5 to 12% $Na_2O$; and
0 to 3% $K_2O$.

4. The glass composition according to claim 3, comprising, in mol %:

55 to 65% $SiO_2$;
11 to 15.5% $Al_2O_3$;
2 to 3.5% MgO;
5 to 11% CaO;
7 to 10% $Li_2O$;
7 to 10% $Na_2O$; and
0 to 2% $K_2O$.

5. The glass composition according to claim 1, comprising, in mol %:

55 to less than 64% $SiO_2$;
11 to 15.5% $Al_2O_3$;
2 to 3.5% MgO;
more than 5 to 11% CaO;
more than 7.7 to less than 10% $Li_2O$;
7 to less than 9% $Na_2O$; and
0 to 2% $K_2O$, wherein
[R'O] is 8 to 13%, and
$[R_2O]$ is 15 to 17% or less.

6. The glass composition according to claim 5, wherein $[CaO]/([CaO]+ [MgO])$ is 0.650 to 0.850, and
$[Na_2O]/([Na_2O]+ [Li_2O])$ is 0.360 to 0.600.

7. The glass composition according to claim 1, wherein $[SiO_2]$ is 55 to 62%.

8. The glass composition according to claim 1, wherein [MgO] is 2% to less than 3%.

9. The glass composition according to claim 1, further comprising, in mol %:

0 to 0.2% $TiO_2$; and
0 to 0.2% $ZrO_2$, wherein
$[TiO_2]+[ZrO_2]$ is 0.2% or less.

10. The glass composition according to claim 1, further comprising, in mol %:

0 to 0.07% $SnO_2$; and
0 to 0.07% $CeO_2$, wherein
$[SnO_2]+[CeO_2]$ is 0.07% or less, and
the glass composition is substantially free of $P_2O_5$, $B_2O_3$, SrO, BaO, $Nb_2O_5$, a lanthanide oxide, $Y_2O_3$, $Ta_2O_5$, and F.

11. A glass sheet formed of the glass composition according to claim 1.

12. The glass sheet according to claim 11 being float glass.

13. A substrate for an information recording medium, comprising the glass sheet according to claim 11.

14. A method for producing a glass sheet, comprising:
melting glass raw materials; and
shaping the molten glass raw materials into a glass sheet by a float process, wherein
the glass raw materials are prepared so that the glass sheet is formed of the glass composition according to claim 1.

* * * * *